Figure 1:
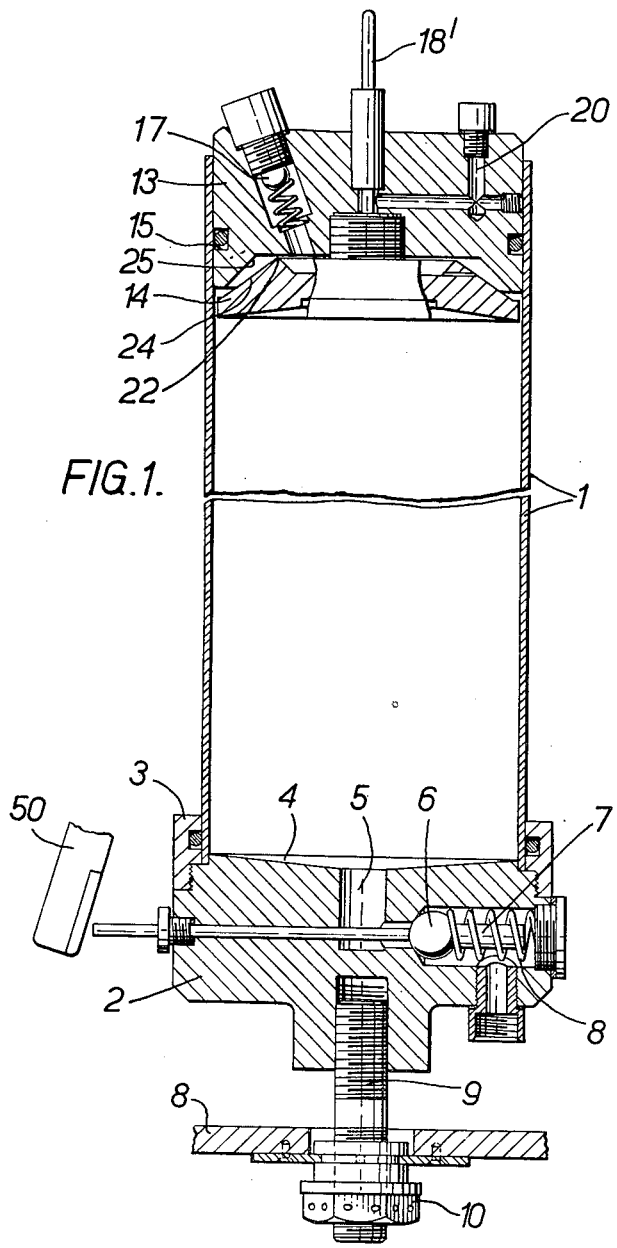

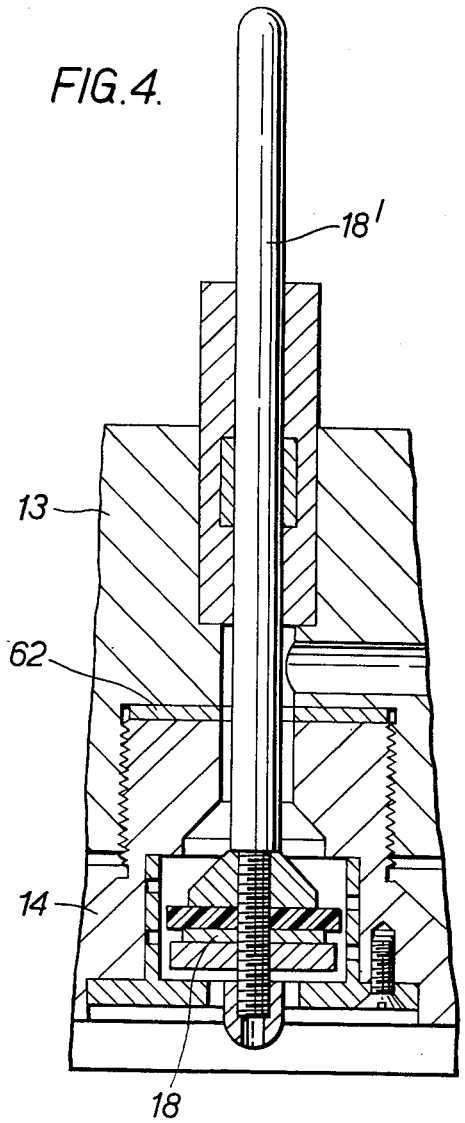

United States Patent Office 3,159,261
Patented Dec. 1, 1964

3,159,261
LIQUID DISPENSING APPARATUS
Frank Ernest Prior, 47 Cecil Road, Hounslow East,
Middlesex, England
Filed Mar. 26, 1962, Ser. No. 182,261
9 Claims. (Cl. 194—13)

This invention relates to liquid dispensing apparatus. Various types of apparatus have been proposed for dispensing predetermined quantities of liquid but, in general, such prior proposals have been rather complicated in design and it is an object of this invention to provide a simplified apparatus suitable for dispensing, for example, beverages such as beer or mineral water or power liquids such as petrol or paraffin. One difficulty sometimes encountered in dispensing liquids is that of frothing of the liquids and this is especially so in the case of gaseous liquids such as mineral waters, beers, stouts and other beverages. It is another object of the present invention to provide a hand dispensing apparatus in which frothing of the liquid being dispensed is kept to a minimum.

According to the present invention I provide an apparatus for dispensing a predetermined quantity of liquid comprising a container for the liquid to be dispensed, inlet and outlet valves for the liquid entering and leaving the container and means whereby liquid entering the container is directed outwardly onto the internal surface of the container walls so that frothing of the liquid during filling of the container is reduced. Conveniently the apparatus may be controlled by a coin, disc key or the like adapted on insertion to initiate filling of the container and also arranged to permit manual operation of the outlet valve to allow the liquid to run out of the container. If desired the capacity of the container may be adjustable.

Preferably the means for directing liquid outwardly includes a baffle shaped so that liquid falling thereon is directed at an inclination onto the internal surface of the container walls. The baffle may be conical and where a cylindrical container is used a curtain of liquid may in this way be advantageously directed onto the walls. Alternatively the baffle may be replaced by a series of nozzles through which streams of liquid can be directed onto the walls, or a spray head may be used having peripherally disposed holes and where circumstances require a substantially complete curtain of liquid around the walls of the container, the nozzles, or the spray head as the case may be, may be mounted for rotation about a longitudinal axis within the container.

The invention further includes means whereby when a predetermined quantity of liquid has been delivered from the container the apparatus is re-set in readiness for the next operation.

Preferably the container is cylindrical and is disposed with its longitudinal axis vertical and the container may, if desired, have a baffle in the form of a piston constituting an upper cover for the container, capacity adjustment being effected by moving the piston and cylindrical container relatively to one another, for example, by using a screw feed or a rack and pinion movement. The relative movement may be effected by fixing the container and by moving the piston but I prefer to fix the piston and to move the container relatively thereto.

In one embodiment in accordance with the invention the inlet valve and the means to direct the liquid onto the internal surface of the container walls are carried by the piston which constitutes the baffle, movement of the cylinder relatively to the piston being performed by means of a suitable adjusting screw preferably disposed below the container.

In a preferred embodiment of the invention the piston comprises two elements, a first upper element including an inlet valve and a second lower element of generally frusto-conical cross-section forming the baffle part of the piston and so shaped to direct incoming liquid from the inlet valve onto the walls of the container. The second element or baffle of the piston may have an annular rib which divides the conical surface into two annular portions. When dispensing a mixture of two or more liquids fed separately into the container the liquids may be directed into the inner portion of the second element where the liquids mix and from which the mixture flows over the rib onto the outer portion which directs the mixture onto the sides of the container. The first element of the piston may be recessed to accommodate the second element or baffle so as to form an annular discharge nozzle between the elements through which the liquid is discharged onto the container walls. Preferably the wall of the recess and the frusto-conical part of the second element which together form the annular discharge nozzle are slightly convergent with respect to the container walls and the relative distance between the elements is adjustable to regulate the flow through the annular discharge nozzle. Liquid flow may also be regulated by adjusting the height of the annular rib.

Mounted in the container and preferably at the top there is a control valve which is set to correspond with the quantity of liquid required to be fed into the container. This control valve, which may be mounted coaxially with the two elements forming the baffle, is arranged to be closed by the liquid when the container has received the required amount of liquid and closing of the valve is operable to shut off the flow of liquid into the container.

It may be when liquid is being discharged from the container that a certain amount of back pressure is set up and liquids may tend to surge upwards. To accommodate such a surge the container may be fitted with an expansion chamber at the top. Communication between the control valve and the expansion chamber may be via a labyrinth passageway located between the valve and the elements forming the baffle.

The mechanism controlling the operation of the apparatus is preferably coin freed and may include an interrupter disposed in the path of a coin so that insertion of a first coin trips the interrupter to prevent any further coins passing into the mechanism until the chain of operations initiated by the first coin has been completed. Preferably the mechanism has an arrester disposed in the coin path, which may be a chute, so that when a coin is arrested a particular operation is performed, for example filling of the container begins. Arresting of the coin may trigger a micro-switch to close a pump circuit to permit liquid to be introduced into the container through the inlet valve. When the required quantity of liquid has been introduced into the container the control valve is operated which displaces the arrester and allows the coin to drop. Displacement of the arrester switches off the pump and the falling coin initiates movement of a mechanical linkage to render the outlet valve manually operable.

Figure 2:
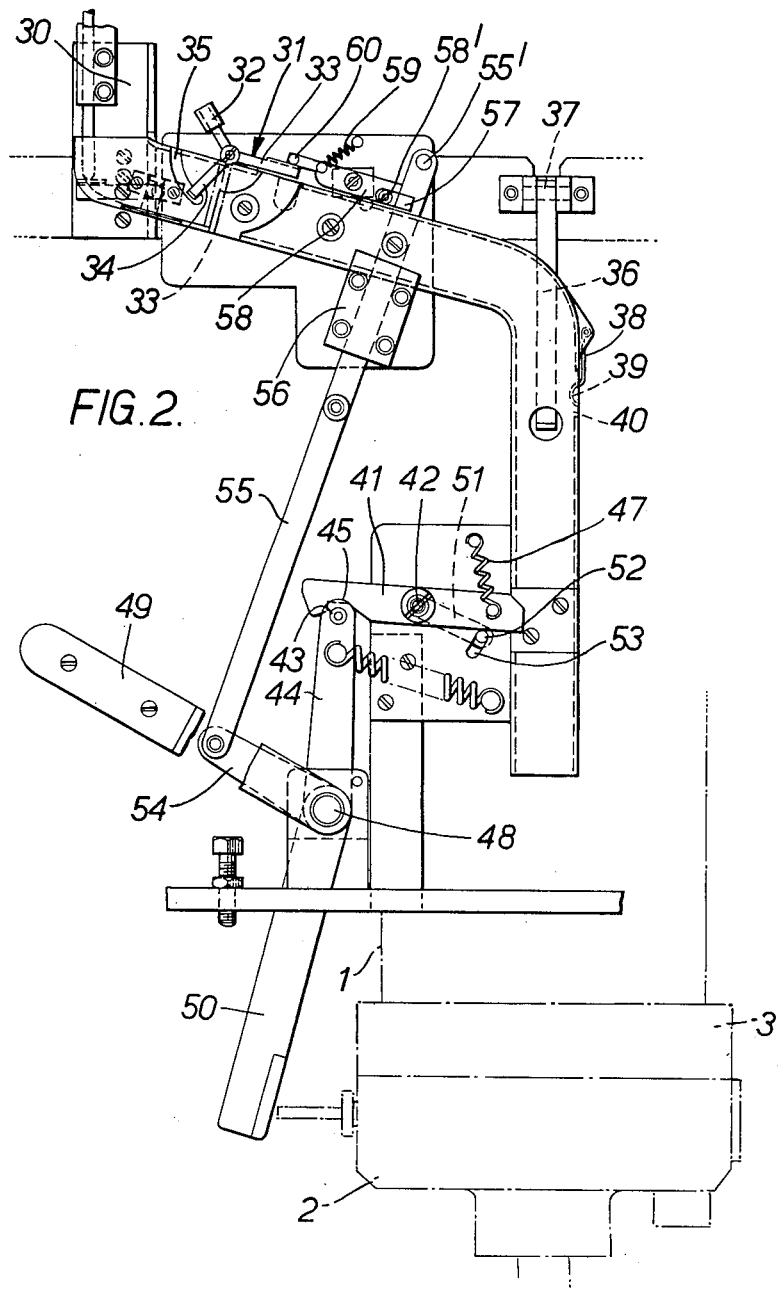
Figure 3:
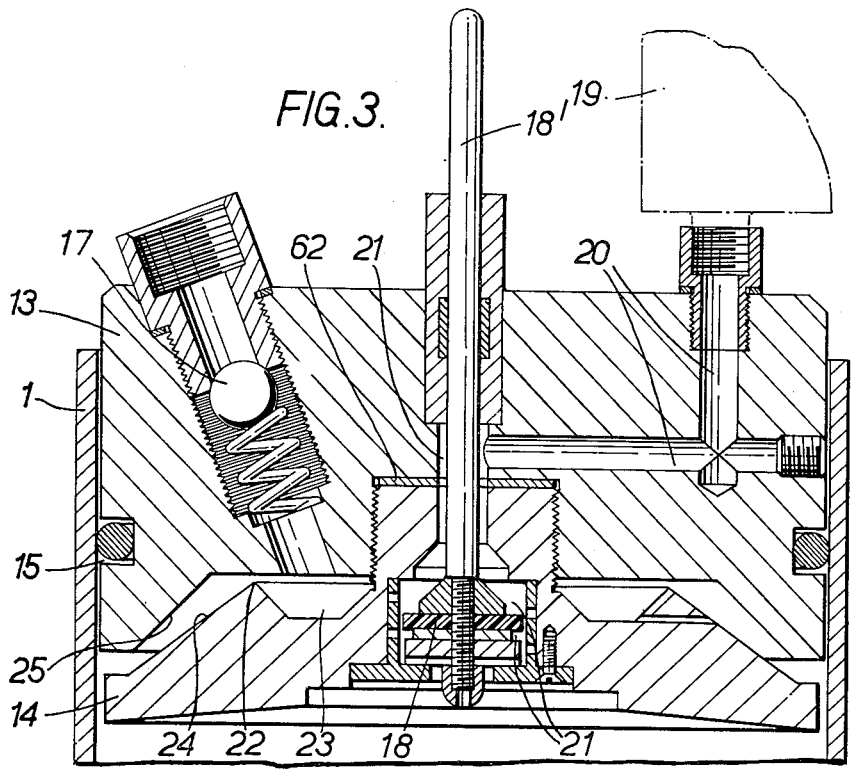

One form of liquid dispensing apparatus in accordance with the invention will now be particularly described by way of example with reference to the accompanying drawings, in which:

FIGURE 1 is a section through the container;
FIGURE 2 shows the coin freed mechanism;
FIGURE 3 is a detail view of the top of the container partly in section; and
FIGURE 4 is a detail view of the control valve.

Referring to FIGURE 1 of the drawings, a Pyrex cylindrical container 1 is held in sealed contact with a base 2 by a clamping ring 3 threaded on to the base member of the apparatus. The base is conically shaped at 4 to permit liquid from the container to drain away through outlet 5 which is fitted with a plunger operated nylon ball valve 6. To aid seating of the ball valve a stem 7 is provided which is located in the spring 8 as shown in FIGURE 1.

The container is supported on a supporting plate 8 bored so that a threaded rod 9 is a clearance fit. A nut 10 is threaded to correspond with the rod 9 and the arrangement is adapted so that when the nut 10 is rotated the container 1 is raised or lowered relative to elements 13 and 14 which are fixed and which in effect form a piston member.

The Pyrex container 1 is fitted at the top with a cover consisting of the two elements 13 and 14 which are fixed relative to the container. Element 13 has an annular groove 15 in which a nylon ring seal is housed. The element 13 also carries a ball valve 17, an inlet control valve 18 set to be operable according to the quantity of liquid required in the container, and an expansion chamber 19 communicating with the container through duct 20 and labyrinth 21 disposed between the valve 18 and the second element, details of the inlet control valve 18 being shown in FIGURE 4.

The element 14 constitutes a baffle member and is of generally frusto-conical cross-section having an annular rib 22. The distance between the annular rib 22 and the under surface of the elements 13 is adjustable by the insertion of washers 62 of different thicknesses. The rib 22 divides element 14 into two parts, an inner part 23 into which incoming liquid is directed and an outer part 24 which forms one side of an annular discharge nozzle. The other side of the discharge nozzle is formed by inclined surface 25 of a recess formed in element 13 in which element 14 is housed. The inclinations of surfaces 24 and 25 are such that the surfaces converge towards the container wall.

The coin freed mechanism illustrated in FIGURE 2 is used in conjunction with a commercially available coin checking mechanism, not illustrated, for checking that the weight, thickness, diameter and other physical quantities are met by the inserted coin, which, if it fails to reach the required standards, is rejected. From the coin checking mechanism a coin is directed along chute 30. An interrupter 31 having three arms 32, 33 and 34 rotatably mounted about an axis just outside the chute 30. Before any coin is introduced the arm 33 is positioned across the chute as indicated by a dotted line in FIGURE 2 and rotation of the interrupter is limited according to the extent of an arcuate slot 35 in which a flanged end of the arm 34 is movable. The remaining arm 32 carries a weight the position of which is adjustable.

An arrester 36 extends into the chute 30 and consists of a bell crank lever pivoted as shown about axis 37. Disposed immediately above the arrester 36 is a pivoted microswitch actuating arm 38 which has a projection 39. The projection 39 enters the chute 30 through a slot 40 and, in the non-operative position of the mechanism, extends into the chute.

Extending into the chute and below the arrester 36 is one link 41 of a mechanical linkage which forms part of a manual control for the outlet valve of the container. The link 41 is pivoted about the axis of a stud 42 and has that end remote from the chute shaped with a detent. The detent is shaped so that a pin 43 on a lever 44 can ride on a cam surface 45 when the lever 41 is turned in a clockwise direction through a small angle against the tension of a spring 47. This is accomplished when the coin is released by the arrester 36 and falls on to that part of the link 41 projecting into the chute. A further lever 51 secured to the stud 42 has a spigot 52 and movement of lever 41 is limited by the extent of an arcuate slot 53 in a side plate.

The link 44 is keyed to a shaft 48 to which an operating handle 49 and an outlet valve actuating link 50 are also keyed.

Also keyed on the shaft 48 is an intermediate link 54 pivoted to which is a lever 55 movable in an inclined direction in a guide block 56. The end of the lever 55 remote from the lever 54 carries a fixed spigot 55′ disposed so that during longitudinal downward movement of the lever 55 the spigot rides over a spring biassed pawl 57. Rotation of the pawl in an anti-clockwise direction is prevented by a shoulder 58′ on a lever 58. The pawl 57 is pivoted to the lever 58 and this lever is biassed against rotation in an anti-clockwise direction by a tension spring 59. The end of the lever 58 remote from the pawl carries a spigot 60 which is cooperable in certain circumstances to be later described with the arm 33.

In operation a coin is inserted into the apparatus, checked by the coin checking mechanism (not shown) and is permitted, if satisfactory, to enter the coin chute 30. When the coin reaches the interrupter 31 (arm 33 of which is in the dotted position shown in FIGURE 2) the arm 33 is turned through approximately 90° into the full line position shown in FIGURE 2. In this position the arm 34 extends across the chute and the weight 32 holds the interrupter in this position and prevents any further coins from entering the mechanism until all the operations to be performed by a coin passing through the mechanism have been completed.

Beyond the interrupter the coin is arrested by the arrester 36 and in so doing moves the micro-switch actuating lever 38 to the right (as viewed in FIGURE 2) to actuate the micro-switch (not shown). Actuation of the micro-switch closes a pump circuit and liquid is introduced into the container 1 through the inlet valve 17, see FIGURE 1.

Liquid entering the inlet valve 17 is directed on to the second element 14 from whence it passes over the rib 22 through the annular discharge nozzle between the elements 13, 14 on to the walls of the container. In this way a continuous curtain of liquid is fed into the container 1 thus minimising any tendency of the liquid to froth.

When the required quantity of liquid has been fed into the container 1 the control valve 18 is operated by the liquid to raise valve stem 18′. Raising of the valve stem 18′ operates the horizontal arm 36′ of the bell crank arrester lever 36 thus allowing the coin to drop down the vertical part of the chute 30. This causes the microswitch actuating lever 38 to return to its non-operative position and the pump to be taken out of circuit.

The coin in falling down the vertical part of the chute 30 trips the end of the link 41 which extends into the chute and allows an operator to turn lever 49. Turning of lever 49 results in lever 51 depressing the stem of outlet valve 6 permitting liquid to be discharged. Should the quantity of liquid in the container 1 be more than is required the outlet valve 6 may be closed again by appropriate movement of lever 49. For example, when filling a vessel from the apparatus an operator sometimes wishes to know how full the vessel is so that an estimate can be made of how much more liquid to introduce. With an apparatus according to this invention, the shape of the detent remote from that part of lever 41 extending into the chute 30 allows the pin 43 to ride over the cam surface 45 of the detent when lever 49 is moved which opens or closes the outlet valve 6 to permit discharge of small quantities of liquid from the container.

Initial operation of the outlet valve 6 may cause a back pressure within the container 1 with the result that an upward surge of liquid takes place. This surge of liquid may be accommodated in an expansion chamber indicated generally at 61 and later drains back into the container.

Where an apparatus according to this invention is to be used for dispensing a mixture of two or more liquids the liquids may be introduced into the inner part of the frusto-conical element which then acts as a mixing chamber.

I claim:

1. Apparatus for dispensing a predetermined quantity of liquid, comprising a cylindrical container for the liquid to be dispensed, a supporting closure member at the one end of said container and including an outlet valve for draining said container, a second closure member at the other end of said container and including an inlet valve having a port opening through the inner side of said second closure member, and nozzle forming means including the inner side of said second closure member, said nozzle forming means being of fixed dimensions and forming an annular nozzle of constant size communicating with said port for directing liquid flowing out said port on to the internal surface of the container wall to form a continually flowing curtain of liquid along said wall.

2. Apparatus according to claim 1 wherein said second closure member and said nozzle forming means are equally and simultaneously adjustable longitudinally of said container to vary its capacity.

3. Apparatus according to claim 1 wherein said nozzle forming means includes a baffle having a surface facing the inner side of said second closure member and supported in fixed spatial relationship thereto for forming said nozzle.

4. Apparatus according to claim 3 wherein said inner side and said surface of said baffle are fixedly spaced and formed to provide a substantially frusto-conical chamber of constant volume and open to said port and to the inner surface of said container.

5. Apparatus according to claim 3 wherein said surface of said baffle is frusto-conical.

6. Apparatus according to claim 3 wherein a portion of said surface of said baffle is frusto-conical in part and includes an annular rib dividing said surface into a fluid receiving portion apart from the frusto-conical portion thereof.

7. An apparatus according to claim 3 and further comprising a control valve mounted coaxially with said second member and said baffle and arranged to be closed by the liquid when the container has received the required amount of liquid, closing of the control valve being operable to shut off the flow of liquid through the inlet valve into the container.

8. An apparatus according to claim 7 characterized by the provision of an expansion chamber to accommodate any liquid that may surge backwards, communication between the control valve and the expansion chamber being maintained through a labyrinth passageway between said control valve and said baffle.

9. Apparatus for dispensing a predetermined quantity of liquid, comprising a vertical cylindrical container for the liquid to be dispensed, a supporting plate member sealed to the lower end of said container and including a manually operable outlet valve for draining said container, a sealing element slidably disposed within the upper end of said container and including an inlet valve having a port opening through the lower side of said sealing element, said sealing element having a frusto-conical configuration on its lower side, and a baffle member fixed to said sealing element and having a mating frusto-conical surface disposed at a fixed spatial relationship to and facing the lower side of said sealing element to define a baffle chamber of constant volume, said baffle member having its outer periphery spaced from the inner surface of said container to form an annular fluid conducting slot communicating with said chamber.

References Cited in the file of this patent

UNITED STATES PATENTS

| | | |
|---|---|---|
| 441,615 | Fairchild | Nov. 25, 1890 |
| 652,992 | Arnold | July 3, 1900 |
| 2,761,606 | Pahl et al. | Sept. 4, 1956 |
| 2,789,592 | Luther | Apr. 23, 1957 |
| 2,813,965 | Arnett | Nov. 19, 1957 |

OTHER REFERENCES

German printed application, 1,033,070, June 26, 1958.